United States Patent [19]

Suzuki et al.

[11] Patent Number: 4,904,535

[45] Date of Patent: Feb. 27, 1990

[54] ADHESIVE AND BONDING PROCESS

[75] Inventors: Rentaro Suzuki; Shinichiro Ikeda, both of Gunma, Japan

[73] Assignee: Denki Kagaku Kogyo Kabushiki Kaisha, Tokyo, Japan

[21] Appl. No.: 166,940

[22] Filed: Mar. 11, 1988

[51] Int. Cl.$^4$ .................... B32B 15/08; B32B 27/06; C08L 85/02

[52] U.S. Cl. .................... 428/463; 428/522; 525/188; 525/190; 525/213

[58] Field of Search ............ 428/463, 457, 522; 525/190, 213, 188

[56] References Cited

U.S. PATENT DOCUMENTS

| | | | |
|---|---|---|---|
| 2,329,456 | 9/1943 | Campbell | 525/190 |
| 4,724,186 | 2/1988 | Kelch | 428/463 X |
| 4,731,292 | 3/1988 | Sasaki et al. | 428/522 X |
| 4,740,427 | 4/1988 | Ochiumi et al. | 428/463 |

*Primary Examiner*—Thomas J. Herbert
*Attorney, Agent, or Firm*—Sughrue, Mion, Zinn, Macpeak & Seas

[57] ABSTRACT

An adhesive having superior adhesive properties between metal/metal, metal/plastic or plastic/plastic and a bonding process therebetween are provided, which adhesive is composed mainly of a copolymer comprising the respective units of 50 to 95% by weight of vinyl chloride, 5 to 50% by weight of a vinyl carboxylate ester and 0.01 to 5% by weight of a phosphoric acid ester having a C—C double bond and copolymerizable with the foregoing vinyl monomers, and having an average degree of polymerization of 100 to 900, and which bonding process comprises dissolving the adhesive in an organic solvent, coating the solution onto substrates, drying the coated substrate and bonding the substrates onto each other on heating under pressure.

7 Claims, No Drawings

ADHESIVE AND BONDING PROCESS

BACKGROUND OF THE INVENTION

1. Field of the Invention

This invention relates to an adhesive between metallic substrates or between plastics substrates such as polyvinyl chloride (PVC) or between metallic and plastics substrates and a bonding process using the adhesive.

2. Description of the Related Art

Vinyl chloride-vinyl acetate copolymers have so far been broadly used as an adhesive between metal and metal or between metal and plastic. Among these, vinyl chloride-vinyl acetate-maleic acid terpolymer having carboxyl groups in the molecule has been known to have superior adhesive properties onto metals Commercially available examples of such resins are Denka Vinyl #1000C, Denka Vinyl #1000CK (both, tradenames of products manufactured by Denki Kagaku Kogyo Kabushiki Kaisha), UCAR$^R$ Solution Vinyl VMCH, UCAR$^R$ Solution Vinyl VMCC (both, registered tradenames of products manufactured by Union Carbide Corp., see U.S. Pat. No. 2,329,456). 'S'lec M (tradename of product manufactured by Sekisui Chemical Company. Ltd.) and, Zeon 400X 110A (tradename of product manufactured by Nippon Zeon Co., Ltd.), etc.

Since such copolymers adhere tightly onto metals and have a superior compatibility and affinity with PVC sheet, they are particularly suitable for metal-PVC sheet adhesion and have also been used as a PVC-steel plate adhesive. These instances have been disclosed in various literature and patent publications, as generally described in Yasuo Nonaka, Journal of The Adhesion Society of Japan. 8, 8 (1927); Kikuo Matsuzaka, Journal of The Adhesion Society of Japan, 17, 317 (1981); and Tetsuya Ohhashi. Journal of The Adhesion Society of Japan, 19, 110 (1983).

However, since no insufficient adhesion strength is obtained by way of these copolymers alone, their strength has been supplemented by blending elastomers or various kinds of additives therewith, but an adhesive affording a sufficient adhesion strength has not yet been found.

SUMMARY OF THE INVENTION

An object of the present invention is to provide an adhesive of a vinyl chloride copolymer having superior adhesive properties between metallic substrates or between plastic substrates or between metallic and plastic substrates.

Another object of the present invention is to provide a bonding process using a vinyl chloride copolymer adhesive.

The present invention in a first aspect resides in an adhesive containing as a main component a copolymer comprising the respective units of 50 to 95% by weight of vinyl chloride. 5 to 50% by weight of a vinyl carboxylate ester and 0.01 to 5% by weight of a phosphoric acid ester having a carbon-carbon double bond and copolymerizable with the foregoing vinyl monomers, and having an average degree of polymerization of 100 to 900.

The present invention in a second aspect resides in a bonding process which comprises dissolving in an organic solvent an adhesive containing as a main component a copolymer comprising the respective units of 50 to 95% by weight of vinyl chloride, 5 to 50% by weight of a vinyl carboxylate ester and 0.01 to 5% by weight of a phosphoric acid ester having a carbon-carbon double bond and copolymerizable therewith, and having an average degree of polymerization of 100 to 900, followed by coating the resulting solution onto substrates to be adhered, drying the coated substrate and bonding the substrates onto each other by heating under pressure.

DETAILED DESCRIPTION OF PREFERRED EMBODIMENTS

The copolymer as a main component used in the present invention is a resin obtained by copolymerizing the respective monomers so as to give the above-mentioned respective proportions, and the details of the respective component units are as follows:

As to vinyl chloride. its unit content is suitably in the range of 50 to 95% by weight, preferably 70 to 90% by weight based on the weight of the total components. If the content is less than 50% by weight, adhesive properties lower, while if it exceeds 95% by weight, the resulting copolymer, when dissolved, has a high viscosity so that the solution has an inferior workability.

As the vinyl carboxylate ester, vinyl acetate, vinyl propionate vinyl stearate, vinyl versatate, etc., are exemplified. Among these, vinyl acetate is preferred. Its content in the copolymer is suitably in the range of 5 to 50% by weight, preferably 5 to 30% by weight.

As the copolymerizable phosphoric acid ester having a carbon-carbon double bond, 2-acid phosphoxyethyl acrylate, 3-chloro-2-acid phosphoxypropyl acrylate, 2-acid phosphoxypropyl acrylate, 2-acid phosphoxyethyl methacrylate, 3-chloro-2-acid phosphoxypropyl methacrylate, 2-acid phosphoxypropyl methacrylate, etc., are enumerated. The content thereof in the copolymer is suitably in the range of 0.01 to 5% by weight, preferably 0.1 to 3% by weight. If it is less than 0.01% by weight, the adhesive properties lower, while if it exceeds 5% by weight, the solubility thereof in solvents is inferior.

In addition, monomers copolymerizable with these monomers may be copolymerized in the range of 40% by weight or less, but the kind and quantity thereof should be determined within the range in which the physical characteristics and adhesive properties of the above vinyl chloride copolymer are not damaged. Representative examples of such copolymerizable monomers are vinylidene chloride, 2-hydroxyethyl methacrylate, methyl methacrylate, acrylonitrile, styrene, maleic acid, etc.

Further, the average degree of polymerization of the copolymer is in the range of 100 to 900. If it is less than 100, the adhesive properties are low, while if it exceeds 100, the solubility thereof in solvents is inferior and hence such average degree is not practical. A generally preferred degree of polymerization is in the range of 300 to 700.

Next, a general process for producing the copolymer used in the present invention will be described.

The polymerization may be carried out according to any of a solution polymerization process, suspension polymerization process, emulsification process and bulk polymerization process usually employed, but among these, solution polymerization process is optimum, taking the purity of the product and the ease of production into account. This process may be carried out by feeding a suitable polymerization solvent and definite quantities of vinyl chloride, a vinyl carboxylate ester and a copolymerizable phosphoric acid ester having a carbon-carbon double bond, adding a polymerization initiator and heating these. In this case, a process of adding vinyl chloride and a copolymerizable phosphoric acid ester having a carbon-carbon double bond in one shot at the initial period of the polymerization, a process of adding them in divided quantities with the progress of the polymerization, etc., may be mentioned, but in order to obtain a copolymer having a uniform composition, the latter process of addition in divided quantities is preferred. From the thus obtained copolymer solution, the solvent is removed in a conventional manner to obtain the objective copolymer. Further, the proportion of the solvent in the copolymer solution obtained by the polymerization may be adjusted and the resulting solution may also be used as the adhesive.

The adhesive of the present invention may be used by dissolving the vinyl chloride copolymer as its main component in a solvent, but if necessary, other thermoplastic resins, thermoset resins, plasticizers, pigments, fillers and other additives conventionally blended in adhesives of such a kind may be blended.

As the solvent used in the present invention, ketones such as methyl ethyl ketone, etc., aromatic hydrocarbons such as toluene, etc., and esters such as ethyl acetate, etc., are suitable.

As to other additionally blended resins, the kind and quantity thereof should be carefully determined so as not to lower the adhesive properties of the adhesive.

As the thermoplastic resins to be blended, vinyl chloride copolymers such as a vinyl chloride-vinyl acetate copolymer, vinyl chloride-vinyl acetate-maleic acid copolymer, vinyl chloride-vinyl acetate-vinyl alcohol copolymer, vinyl chloride-vinylidene chloride copolymer, etc., cellulosic resins such as nitrocellulose, etc., thermoplastic methacrylic acid ester resins, polyurethane resins, polyester resins, nitrile rubbers, styrene-butadiene rubbers, etc., may be used.

Further, as the thermoset resins, polyisocyanates, urethane prepolymers, phenolic resins, epoxy resins, urea resins, melamine resins, alkyd resins, silicone resins, acrylic reactive resins, etc., may be blended.

When the adhesive of the present invention is used, the adhesive of the present invention may be coated onto the respective substrates to be adhered, such as metals e.g., aluminum (Al), steel stock, etc., plastics such as PVC, etc., followed by drying the resulting coated substrates and then heating them under pressure to adhere the substrates to each other. The quantity of the adhesive coated onto the substrates varies depending on the kind, etc., of the substrates to be adhered, but the coating may be carried out usually in a rate of 10 to 100 g/m². As the coating process, any conventional processes may be employed. Examples thereof are a dipping process, brushing process, roll coating process, spray process, etc., Further, as the drying process, cold drying, heating drying. etc., may be employed. As the treating conditions of heating under pressure after the drying, about 80° to 250° C. and 0.1 to 10 Kg/cm²G may be employed.

The present invention will be described in more detail by way of Examples and Comparative examples.

EXAMPLE 1

Into a 5 l capacity stainless autoclave were introduced vinyl chloride (1.660 g), vinyl acetate (280 g), 2-acid phosphoxyethyl methacrylate (10 g), acetone (1,560 g) and benzoyl peroxide as a polymerization initiator (6 g), and polymerization was initiated at 45° C., followed by five times adding a solution consisting of 2-acid phosphoxyethyl methacrylate (10 g) and acetone (10 g), each 15% conversion, and cooling the reaction mixture at a conversion of 90% to terminate the polymerization.

The solvent was then removed from the resulting copolymer solution to obtain the copolymer in powder form.

This copolymer, as a result of analysis, consisted of the respective units of 85% by weight of vinyl chloride, 12% by weight of vinyl acetate and 3% by weight of 2-acid phosphoxyethyl methacrylate, and had an average degree of polymerization of 400 as measured according to a testing method of vinyl chloride resin (JIS K 6721).

With the thus obtained copolymer, an adhesive was prepared according to the testing method of adhesive force mentioned later and its adhesive strength was measured. As a result, superior adhesive properties as shown in the Table listed later were obtained.

EXAMPLE 2

Example 1 was repeated except that the kind and proportion of monomers fed were varied, to obtain vinyl chloride copolymers.

These copolymers were subjected to the test of adhesive force. As a result, superior properties as in Example 1 were obtained.

The proportions, average degree of polymerization and results of adhesive tests of the vinyl copolymers used are shown in the Table.

COMPARATIVE EXAMPLE 1

A test of adhesive force was carried out replacing the vinyl chloride copolymer of the present invention by UCAR ® solution vinyl VMCH (a tradename of a product manufactured by Union Carbide Company; vinyl chloride/vinyl acetate/maleic acid=86/13/1 (ratio by weight); average degree of polymerization 420). The test results are shown in the Table.

COMPARATIVE EXAMPLE 2

The kind and proportion of monomers were varied as in Example 2 to obtain vinyl chloride copolymers.

The proportion, average degree of polymerization and results of adhesive tests of vinyl chloride copolymers used are shown in the Table.

TESTING METHOD OF ADHESIVE FORCE (Test 1)

Vinyl chloride copolymers described in Examples and Comparative examples were each dissolved in a mixed solvent of methyl ethyl ketone/toluene=1/1 (ratio by weight) to prepare 20% by weight solutions and the solutions were used as adhesives, respectively.

Al/Al (each a hard Al foil of 20 μm thick) were used as bases, and the respective adhesives were coated onto the bases (25 mm×125 mm) at a rate of 16 g/m², followed by drying the coated bases at 180° C. for 10 seconds, applying them onto each other and subjecting them to contact bonding at 200° C. under 2 kg/cm²G and for one second. The T-peel strength of the resulting materials were sought according to a testing method peel strength of an adhesive (ASTM D-1876). The results are shown in the Table.

(Test 2)

of peel adhesive strength of an adhesive. The results are shown in the Table.

TABLE

| Run No. | Example 1 | Example 2 | | | | | | | | | Comp. ex. 1 | Comp. ex. 2 | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Vinyl chloride copolymer Composition of copolymer (% by weight) | | | | | | | | | | | | | | | | |
| Vinyl chloride | 85 | 54 | 68 | 74 | 81 | 87 | 91 | 85 | 85 | 85 | 86 | 40 | 97 | 85 | 85 | 85 |
| Vinyl carboxylate ester | $a_{12}$ | $a_{44}$ | $a_{32}$ | $a_{22}$ | $a_{19}$ | $a_{12}$ | $a_{6}$ | $a_{12}$ | $a_{12}$ | $b_{12}$ | $a_{13}$ | $a_{59}$ | $a_{2}$ | $a_{7}$ | $a_{12}$ | $a_{12}$ |
| Copolymerizable phosphoric acid ester having C—C double bond | $c_{3}$ | $c_{2}$ | $c_{0.3}$ | $c_{4}$ | $c_{0.03}$ | $c_{1}$ | $c_{3}$ | $d_{3}$ | $c_{3}$ | $c_{3}$ | — | $c_{1}$ | $c_{1}$ | $c_{8}$ | $c_{3}$ | $c_{3}$ |
| Maleic acid | — | — | — | — | — | — | — | — | — | — | 1 | — | — | — | — | — |
| Average degree of polymerization | 400 | 310 | 350 | 620 | 680 | 520 | 450 | 400 | 400 | 400 | 420 | 380 | 450 | 410 | 80 | 1000 |
| Test results of adhesive force | | | | | | | | | | | | | | | | |
| Test 1 T-peel strength (kgf/25 mm) | 1.6 | 1.3 | 1.4 | 1.4 | 1.3 | 1.5 | 1.4 | 1.5 | 1.5 | 1.5 | 1.1 | 1.0 | * | 0.7 | 0.3 | * |
| Test 2 T-peel strength (kgf/25 mm) | 2.6 | 1.8 | 1.9 | 2.0 | 1.8 | 2.4 | 2.2 | 2.5 | 2.6 | 2.3 | 1.7 | 1.5 | * | 1.3 | 0.5 | * |
| Test 3 Tensile shear strength (kgf/cm$^2$) | 78 | 63 | 65 | 68 | 60 | 72 | 70 | 75 | 73 | 70 | 51 | 45 | * | 40 | 25 | * |
| Test 4 180° peel strength (kgf/25 mm) | 5.0 | 3.7 | 4.0 | 4.2 | 3.5 | 4.2 | 4.5 | 4.8 | 4.9 | 4.8 | 3.0 | 2.8 | * | 2.5 | 10 | * |

*The viscosity of the adhesive is so high that coating is impossible.
$^a$Vinyl acetate
$^b$Vinyl propionate
$^c$2-Acid phosphoxyethyl methacrylate
$^d$2-Acid phosphoxyethyl acrylate
$^e$2-Acid phosphoxypropyl methacrylate With the adhesives prepared in Test 1, Al (a hard Al foil of 20 μm thick)/PVC (a PVC sheet having no plasticizer) were bonded together under the same conditions as in Test 1, and the T-peel strengths of the resulting materials were measured. The results are shown in the Table 1.

(Test 3)

Adhesives were prepared in the following formulation:

| | |
|---|---|
| Vinyl chloride copolymer | 10 parts by weight |
| Hycar-1041 (tradename of a nitrile rubber manufactured by Nippon Zeon Company) | 10 parts by weight |
| Methyl ethyl ketone | 40 parts by weight |
| Toluene | 40 parts by weight |

Steel stock/steel stock (SPCC-SD) were used as bases and adhesives were each coated onto each of these bases (25 mm × 12.5 mm) at a rate of 80 g/cm$^2$, followed by drying at 80° C. for 5 minutes, applying the coated bases onto each other and subjecting them to contact bonding at 100° C. under 1 kg/cm$^2$G for 5 minutes. The respective tensile shear strengths of the adhesives were measured according to the testing method of the tensile shear strength of an adhesive (ASTM-D-1002). The results are shown in the Table.

(Test 4)

A steel stock (SPCC-SD)/PVC (a soft PVC sheet) were used as bases and adhesives prepared in Test 3 were coated onto each of the bases (25 mm × 125 mm) at a rate of 80 g/m$^2$, followed by drying at 80° C. for 5 minutes, applying the bases onto each other and subjecting them to contact bonding at 100° C. under 1 kg/cm$^2$G for 5 minutes. The respective 180° peel strengths were measured according to a testing method of peel adhesive strength of an adhesive. The results are shown in the Table.

The adhesive of the present invention is far superior in the adhesive properties between metal-metal, between metal-plastic such as polyvinyl chloride and between metal-plastic to that of vinyl chloride-vinyl acetate-maleic acid copolymer and hence very useful.

What we claim is:

1. An adhesive for use between metallic substrates, between metallic and plastics substrates or between plastics substrates comprising as a main component, a copolymer comprising 50 to 95% by weight of vinyl chloride, 5 to 50% by weight of a vinyl carboxylate ester and 0.01 to 5% by weight of a phosphoric acid ester having a carbon-carbon double bond and copolymerizable with the foregoing vinyl monomers, and having an average degree of polymerization of from 100 to 900.

2. An adhesive according to claim 1 wherein said phosphoric acid ester having a carbon-carbon double bond is at least one member selected from the group consisting of 2-acid phosphoxyethyl acrylate, 3-chloro-2-acid phosphoxypropyl acrylate, 2-acid phosphoxypropyl acrylate, 2-acid phosphoxyethyl methacrylate, 3-chloro-2-acid phosphoxypropyl methacrylate and 2-acid phosphoxypropyl methacrylate.

3. An adhesive according to claim 1 wherein said vinyl chloride is present in said copolymer in an amount of 70 to 90% by weight.

4. An adhesive according to claim 1 wherein said vinyl carboxylate ester is present in said copolymer in an amount of 5 to 50% by weight.

5. An adhesive according to claim 1 wherein said phosphoric acid ester having a carbon-carbon double bond is present in said copolymer in an amount of 0.1 to 3% by weight.

6. An adhesive according to claim 1 wherein said average degree of polymerization is from 300 to 700.

7. An adhesive according to claim 1, further comprising a thermoplastic resin and/or a thermoset resin.

* * * * *